Feb. 8, 1955    J. V. BOOTH    2,701,447
ROTARY FLUID COUPLING
Filed Dec. 9, 1949    2 Sheets-Sheet 1

INVENTOR.
JOHN VERLYN BOOTH
BY
ATTORNEY

Feb. 8, 1955   J. V. BOOTH   2,701,447
ROTARY FLUID COUPLING

Filed Dec. 9, 1949   2 Sheets-Sheet 2

*INVENTOR.*
JOHN VERLYN BOOTH
BY
ATTORNEY

United States Patent Office 2,701,447
Patented Feb. 8, 1955

2,701,447

ROTARY FLUID COUPLING

John Verlyn Booth, Atlanta, Ga.

Application December 9, 1949, Serial No. 131,970

6 Claims. (Cl. 60—54)

This invention relates to a rotary fluid coupling for transmitting power from a driving member to a driven member. More particularly, this invention provides an hydraulic coupling which utilizes impeller and turbine blades with a fluid transfer medium and a particular arrangement of a fluid baffle.

Many occasions arise in which it becomes necessary to couple some type of power source, such as an electric motor or an internal combustion engine, to a particular driven machine unit. Since these various types of power sources must overcome their inherent torque and starting characteristics before they are directly coupled to the driven unit, some efficient means must be provided so that the load of the driven element may be placed on the driving power source in a smooth and efficient manner.

Various types of hydraulic couplings have been developed in the prior art for coupling a driving element to a driven element; however, they have not been satisfactory from several standpoints, such as efficiency in transfer of power and cost of construction and maintenance. One of the objects of my invention is to provide an hydraulic coupling which permits maximum efficiency and long life to be derived from both the power unit and machine being driven.

Another object of my invention resides in the particular construction whereby any type of power unit is permitted and enabled to gain a major portion of its speed and power before the fluid in the drive becomes energized by the hydraulic vortex within to such extent that the drive begins to turn, spin, and rotate and thus transmit the power generated therein to the machinery being driven.

It is also an object of my invention to provide an hydraulic power transfer arrangement which overcomes or greatly reduces the starting torque, inertia and shock produced in all power producing machinery.

A further object of my invention resides in the particular construction and arrangement of the impeller and turbine blades and a fluid baffle which directs the turbulent flow of a confined liquid to produce a smooth, gradual and efficient transfer of power from a driving element to a driven element.

Also, an object of my invention is to provide a rotary fluid coupling which may be supported so as to remove the weight and vibration of the drive from the power source.

An additional object of my invention resides in the particular construction whereby the power output pulley may be of substantially any size or construction and may be readily secured to the coupling for rigid performance.

Another object of my invention is to provide an hydraulic coupling which may be constructed from a minimum number of parts that are easily and economically manufactured and assembled.

Other and further objects and advantages of my invention will be apparent from the following description taken in conjunction with the accompanying drawings in which like characters of reference designate corresponding parts throughout the several views, and wherein.

Figure 1:
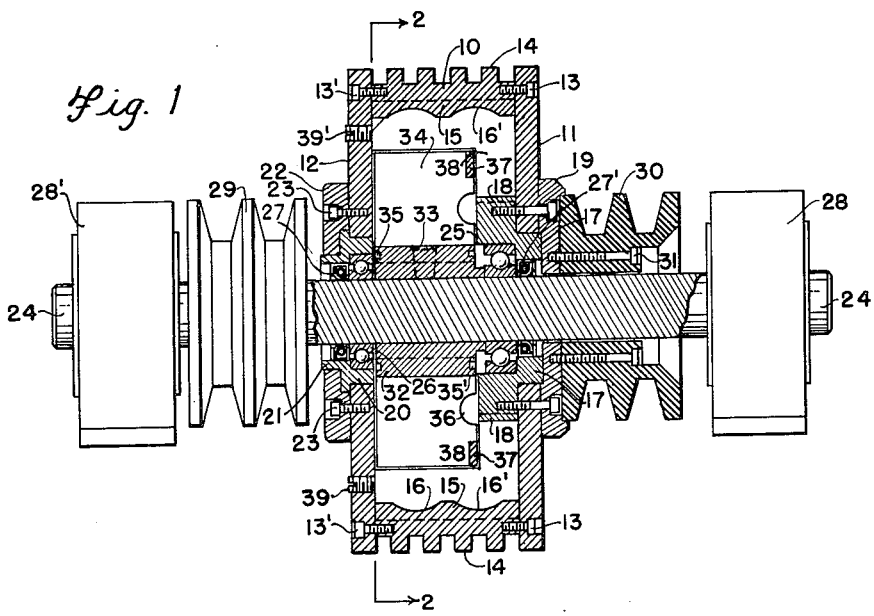
Fig. 1 is an elevation, partly in cross-section of an embodiment of my invention.

In the embodiment of Fig. 1, a generally cylindrical housing 10 is capped by an inboard plate 11 and an outboard plate 12. Plates 11 and 12 are fastened to housing 10 by means of bolts 13 and 13', respectively, to form a completely enclosed casing to seal and hold oil or other fluid under pressure when the drive is finally assembled. The housing 10 is provided on its outer surface with spaced annular cooling vanes 14.

A fluid director 15 is formed integrally with the inside cylindrical wall of the housing 10 and has laterally spaced concave indentations 16, 16' formed on its exposed surface inside of the housing 10. The indentation 16 is adjacent the outboard plate 12 and the indentation 16' is adjacent the inboard plate 11.

The inboard plate 11 has a circular opening at its center which receives a pulley plate liner housing comprising integrally formed offset collars 17 and 18. The smaller bearing retainer collar 17 is enveloped by the opening in plate 11 except for a small project on outside of plate 11; and the larger collar 18, which forms a pulley plate liner ring, abuts the inside of the plate 11. Both collars 17 and 18 have openings in the center. A flat circular pulley plate 19, having an opening in its center and countersunk offset shoulders spaced radially from the opening, is attached to the outside of the inboard plate 11, with the offset shoulders abutting the projection of collar 18, by bolts which pass through the plate 11 into the pulley plate liner ring 18.

The inboard plate 12 has a circular opening in its center receiving a cap liner which comprises a large bearing retainer collar 20 fitted into the circular opening, and formed integrally therewith is a smaller cap and oil ring retainer collar 21 which projects outwardly from plate 12. A center-bored outboard cap 22 has a countersunk portion which fits over the smaller collar 21, and the cap is rigidly attached to the outboard plate 12 by bolts 23.

Extending through the opening in collar 18 on plate 11 transversely of the inside of the housing 10 and through the collar 21 on plate 12 is a drive shaft 24 which is supported for rotation in collar 18 by anti-friction bearing 25 and in collar 20 by anti-friction bearing 26. Outboard of collar 20 is an oil ring seal 27 which is press fitted into the open portion of collar 21 and inboard of collar 18 is an oil ring seal 27' which is press fitted into the open portion of collar 17. These oil ring seals 27 and 27' assure a snug fluidtight joint around the shaft 24.

Shaft 24 extends outwardly from both sides of the housing 10 and has its ends supported for rotation in pillow block bearings 28 and 28', respectively. A drive pulley 29 is secured to shaft 24 between the bearing 28' and the outboard open cap 22 and on the other side of housing 10 a driven pulley 30 is loosely fitted over shaft 24 and rigidly secured to the pulley plate 19 by bolts 31. It is obvious that with this construction any size pulley may be secured to the plate 19 and the rigid arrangement of the housing collars 17 and 18 assures a permanent anchorage for the pulley employed.

Figure 4:
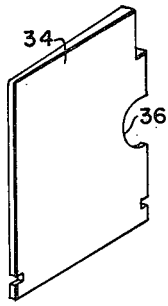
Fig. 4 is a perspective view of a detail.

Inside of housing 10 on shaft 24 is a hub 32 which completely encompasses the shaft 24 and is secured thereto by means of a lock pin 33. Equally spaced in slots around the periphery of the hub are twenty-four tapered impeller blades 34 which are retained in place by two retainer rings 35, 35' fitting into notches in the blades. Each of the blades 34 has an arcuate notch 36 cut into the inboard side. As is readily seen in Fig. 4, each of the impeller blades 34 is tapered from the rear edge, having notch 36, toward the front edge which is adjacent plate 12. A direction blade ring 37 passes through the flat face of each of the blades near the upper inboard corner and provides a fluid director. The hub 32, the blades 5, the retainer rings 35, 35', the lock pin 32, and the ring 37, go together to form an assembled unit known as the impeller.

The shaft 24 with the impeller assembled thereon is pressed into the inboard bearing 25, which bearing 25 is pressed into bearing housing and pulley plate liner 18 to a predetermined depth to where the machined center boss of the hub 32 rests dead against the inner race of inboard bearing 25, to turn freely and be in alignment when the drive is assembled. The machined boss on the hub 32 running dead against the inner race of bearing 25 holds the impeller at the proper distance from the outer race of bearing 25 and other internal parts of the drive.

The inner face of the housing 10 and the inner surface of the inboard plate 11, as well as the outer periphery of the collar 18, are notched or slotted to receive and anchor into place the turbine blades 38 which are of generally L-shaped construction. The back edge of the blades 38 is fitted into the groove in the plate 11, the inner edge is fitted into the groove in the collar 18, and the outer edge is fitted into the housing 10, passing through the director 15. There are twenty-eight turbine blades 38 equally spaced inside the housing 10, and with the L-shaped construction the blades 38 pass over the outer edge and along one side of the impeller blades 34.

After the shaft 24 with the impeller assembled in place has been placed in the bearings 25, 25′ and the inboard plate 11 and outboard plate 12 have been pulled tight against the casing 10, the oil ring seals 27, 27′ are press fitted in the collars 21 and 17, respectively, thereby completing a fluidtight casing which may be filled with hydraulic fluid through plugs 39, 39′ in the outboard plate 12.

Figure 3:
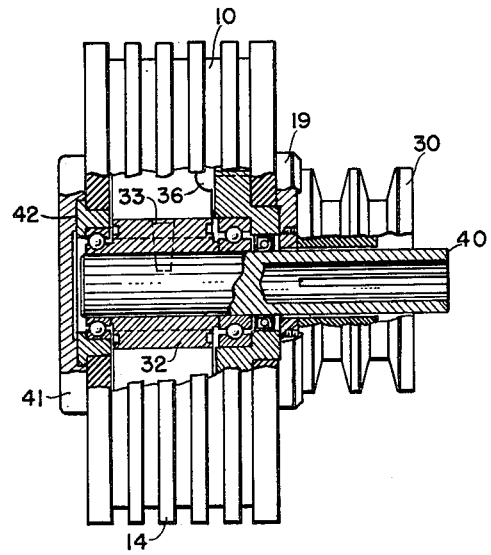
Fig. 3 is an elevation, partly in cross-section, of a modified form of my invention.

In the modification shown in Fig. 3, housing 10 is constructed in the same manner as in Fig. 1, and the internal fluid reaction mechanism is also the same; however, shaft 24 has been replaced by a split shaft 40 which is supported in the housing 10 in the same manner as shaft 24 in the embodiment of Fig. 1 but it does not extend past the outboard side. Shaft 40 terminates adjacent the outboard bearing 27 and the open outboard cap 22 is replaced by a closed outboard cap 41 which has a countersunk inner face fitting over a collar retainer 42 which replaces the open cap liner collars 21 and 22. The output pulley 30 is attached to pulley plate 19 in the same manner as in the embodiment of Fig. 1.

With the arrangement shown in Fig. 3, my fluid coupling is supported in cantilever fashion and the power introduced through the split shaft 40 is transferred through the fluid medium to rotate the housing 10 and therefore the pulley 30. This type of construction is advantageous where there is not sufficient space for the end bearing supports of the embodiment of Fig. 1.

Figure 5:
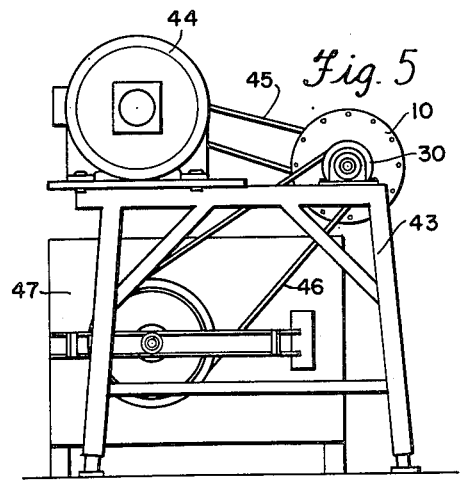
Fig. 5 is an elevation showing a typical installation of the device of Fig. 1.

A typical application of my fluid coupling of the embodiment of Fig. 1 is illustated in Fig. 5 wherein a table-like frame or support 43 has a power source 44 rigidly attached thereto. A drive belt 45 drives the input pulley 29 of my fluid coupling and a power take off belt 46 leads from the output pulley 30 to drive a machine 47.

In the operation of the fluid coupling of the embodiment of Fig. 1, power is applied to the input pulley 29 on shaft 24 from a power source 43 as illustrated in Fig. 5.

The initial turning of the shaft 24 by the power source 43 does not place any considerable drag on the impeller blades 34 against the relatively small resistance of the liquid which fills the chamber within the housing 10, and therefore the power source is able to overcome its starting impediments in a minimum of time. As the shaft 24 gains speed the impeller blades 34, acting against the confined liquid, cause a vortex to form inside of the pressure-tight casing.

The vortex formed by each of the impeller blades 34 rotating at high speed moves toward the outboard plate 12 in a lateral and centrifugal manner forcing against the turbine blades 38. As the fluid is forced to return across the inner periphery of housing 10 it meets resistance and is thrown into a turbulent action by the fluid director 15, and by the longer travel of the fluid caused by the tapered impeller blades 34 and the director surfaces 16 and 16′, more and greater thrust is spent against the turbine blades 38 causing the complete housing 10, including the outboard plate 12 and inboard plate 11, to rotate with great power about shaft 24. The open notches 36 on the blades 34 in conjunction with the tapering of the blades 34 and the direction ring 37 permit the recirculation of the fluid on one side of the drive only. The distribution of the fluid is regulated by the design of my invention so that the fluid turns in 90 degree angles instead of any given radius. As the fluid leaves the vicinity of the inboard plate moving generally toward the axis of rotation to begin the cycle all over, it is directed by the direction ring 37 between the ring 37 and the hub 32 immediately in front of the pulley plate liner 18 and into the arcuate notches 36 which receive the fluid and cause it to take the longest path in circulation. This principle permits the greater flow of a greater volume of fluid with minimum agitation, less friction, less noise, more power and offsets the thrust created by the tapered blades 34.

Since the housing 10, outboard plate 12, and inboard plate 11, are freely movable about the axis of shaft 16 and since the pulley 30 is rigidly fixed to inboard plate 11 through the inboard pulley plate 19, the pulley 30 will rotate with the housing 10. Any suitable means may be employed to take off the power from the pulley 30.

Figure 2:
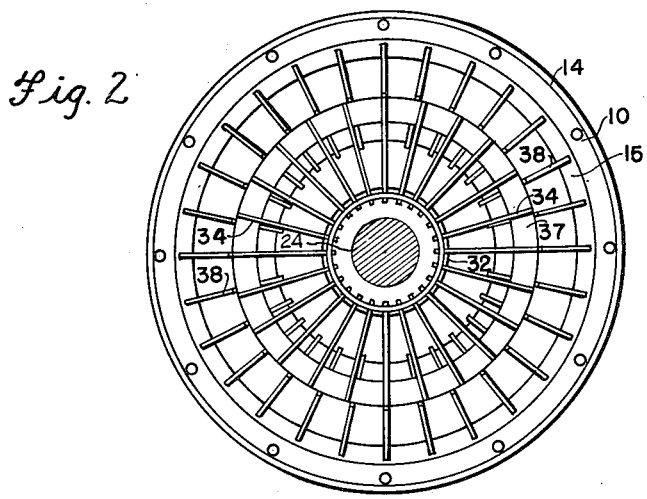
Fig. 2 is a cross-sectional view taken on the line 2—2 of Fig. 1.

There are more turbine blades 38 spaced along the inner periphery of the housing 10 than there are impeller blades 34 on the hub 20 and the ratio is chosen so that for every 90° sector in a transverse vertical plane of shaft 24, see Fig. 2, there is at any stage of rotation a reaction housing blade 38 immediately adjacent to an impeller blade 34. This presents a more even transfer of power and entirely eliminates any dead center positions in the rotary fluid coupling.

This particular construction employing the special fluid director surfaces 16 and 16′ gives an efficiency in the transfer of power through a liquid medium not possible in the various constructions of the prior art. The advantageous arrangement and relationship of the imepller blades 34, the fluid director surfaces 16 and 16′, the direction ring 37, and the turbine blades 38 inside the housing 10 utilize the transfer of energy through a vortex in a smooth and dependable manner.

Applying this operation to the structure of Fig. 5, the power source 44 is permitted to gain a greater portion of its speed and power quickly and without substantial load before the fluid in the casing 10 has had time to become completely activated and energized to such an extent that such fluid begins to move in centrifugal vortex against the turbine blades 38 with sufficient hydraulic force to transmit the power through the pulley 30 and the belt 46 to the driven machine 47, thereby eliminating vibration, shock, heat, and noise.

The operation of the modified embodiment of Fig. 3 is very much the same as for the embodiment of Fig. 1 previously described. The power is applied directly to the split shaft 39 which in turn causes the blades 34 to rotate thereby forcing the vortex against turbine blades 38 causing the same sequence of operations to rotate the housing 10 and the pulley 30 as in the embodiment of Fig. 1.

The internal structure of the housing 10 in Fig. 3 is identical with that of Fig. 1 and therefore the same advantages of transfer of power are inherent in its construction, and although the pillow block bearings 28 of the embodiment of Fig. 1 give a more rigid support to the fluid coupling than the cantilever type of support of the embodiment of Fig. 3, the embodiment of Fig. 3 is advantageous for certain mountings.

My invention is so constructed that all parts therein are machined before final assembly thereby insuring balance, rigidity, and long life. One of the main advantages of my invention is the manner in which all parts are fitted together to form a unit, any part may be removed and replaced with a minimum of time, cost, and effort in event of damage. The outside is machined and grooved into the vanes 14 to dissipate heat, to give it attractiveness, and to make it safe in event of a person falling against it.

It will be obvious to those skilled in the art that my invention provides a needed article of great usefulness, and that while I have illustrated and described my invention without attempting to show all embodiments and adaptations which I contemplate, many modifications and changes may be made in the embodiments shown and described without departing from the scope of my invention as defined in the appended claims.

I claim:

1. In a rotary fluid coupling, a shaft, a fluid tight housing rotatably supported upon said shaft, fluid in said housing, impeller blades fixed to said shaft inside said housing for circulating said fluid within said housing, certain of said blades being tapered axially of said shaft and having an outer corner, fluid directing means interconnecting said blades near said outer corner thereof, an edge of certain of said blades being provided with an open notch for the passage of said fluid, turbine blades spaced around and fixed to the inner surface of said housing, said turbine blades being generally L-shaped and having a portion overlying said impeller blades and another portion extending substantially radially inwardly along an edge of said impeller blades to said open notch, and other fluid director means having concave surfaces formed on the inner peripheral surface of said housing between said turbine blades and arranged to set up turbulence in said fluid, whereby upon rotation of said impeller blades said fluid is circulated from said impeller blades against said turbine blades and around said first mentioned fluid director means to rotate said housing.

2. In a rotary fluid coupling, a shaft, means for rotating said shaft, a fluid tight housing rotatably supported upon said shaft, fluid in said housing, impeller blades fixed to said shaft inside said housing for propelling fluid within said housing upon rotation of said shaft, certain of said blades being tapered axially of said shaft to provide a thick edge and a thin edge, the thick edge of certain of said blades being provided with an open notch for the passage of fluid, turbine blades spaced around and fixed to the inner surface of said housing and reacting to fluid propelled by said impeller blades, said turbine blades being generally L-shaped and having a portion overlying said impeller blades and another portion extending substantially radially inwardly along the thick edge of said impeller blades to said open notch, and fluid directing means having concave surfaces formed on the inner peripheral surface of said housing between said turbine blades and arranged to set up turbulence in said fluid.

3. In a rotary fluid coupling, a shaft, means for rotating said shaft, a fluid tight housing rotatably supported upon said shaft, fluid in said housing, impeller blades fixed to said shaft for circulating said fluid upon rotation of said shaft inside said housing, said blades terminating in outer corners, fluid directing means interconnecting said blades near one of said outer corners thereof, an edge of certain of said blades being provided with an open notch for the reception of fluid, turbine blades spaced around and fixed to the inner surface of said housing, said turbine blades reacting to the circulation of said fluid to rotate said housing, said turbine blades being generally L-shaped and having a portion overlying said impeller blades and another portion extending substantially radially inwardly along an edge of said impeller blades to said open notch, and other fluid directing means having concave surfaces formed on the inner peripheral surface of said housing between said turbine blades and arranged to set up turbulence in said fluid.

4. In a rotary fluid coupling, a shaft, means for rotating said shaft, a fluid tight housing rotatably supported upon said shaft, fluid in said housing, impeller blades fixed to said shaft inside said housing, said fluid being circulated by said blades upon rotation of said shaft, certain of said blades being tapered axially of said shaft to provide a thick edge and a thin edge, fluid directing means interconnecting said blades near the outer portion thereof adjacent the thick edge of said blades, said director means directing the circulation of said fluid, the thick edge of certain of said blades being provided with an open notch for the reception of fluid, turbine blades spaced around and fixed to the inner surface of said housing, said turbine blades being generally L-shaped and having a portion overlying said impeller blades and another portion extending substantially radially inwardly along the thick edge of said impeller blades to said open notch, said turbine blades being driven by said fluid upon circulation thereof, and power take-off means connected to said housing.

5. In a rotary fluid coupling, a shaft, means for rotating said shaft, a fluid tight housing rotatably supported upon said shaft, fluid in said housing, impeller blades fixed to said shaft inside said housing, said fluid being circulated by said impeller blades, certain of said blades being tapered axially of said shaft to provide a thick edge and a thin edge, fluid directing means interconnecting said blades near the outer portion thereof adjacent the thick edge of said blades, said director means directing the circulation of said fluid, turbine blades spaced around and fixed to the inner surface of said housing, said turbine blades being generally L-shaped and having a portion overlying said impeller blades and another portion extending substantially radially inwardly along the thick edge of said impeller blades, said turbine blades reacting to the circulation of said fluid to rotate said housing, and other fluid director means having concave surfaces formed on the inner peripheral surface of said housing between said turbine blades and arranged to set up turbulence in said fluid.

6. In a rotary fluid coupling, a shaft, means for rotating said shaft, a fluid tight housing rotatably supported upon said shaft, fluid in said housing, impeller blades fixed to said shaft inside said housing, certain of said blades being tapered axially of said shaft to provide a thick edge and a thin edge, fluid directing means interconnecting said blades near the outer portion thereof adjacent the thick edge of said blades, the thick edge of certain of said blades being provided with an open notch for the passage of fluid, turbine blades spaced around and fixed to the inner surface of said housing, said turbine blades being generally L-shaped and having a portion overlying said impeller blades and another portion extending substantially radially inwardly along the thick edge of said impeller blades to said open notch, and other fluid director means having concave surfaces formed on the inner peripheral surface of said housing between said turbine blades and arranged to set up turbulence in said fluid, whereby said housing is rotated by said turbine blades reacting to the circulation of said fluid by said impeller blades upon rotation of said shaft.

References Cited in the file of this patent

UNITED STATES PATENTS

| Number | Name | Date |
|---|---|---|
| 905,885 | Kingman | Dec. 8, 1908 |
| 984,849 | Radcliffe | Feb. 21, 1911 |
| 1,047,948 | Karminski et al. | Dec. 24, 1912 |
| 1,224,669 | Rounds | May 1, 1917 |
| 1,540,453 | Arave | June 2, 1925 |
| 1,918,163 | Wohlenhaus | July 11, 1933 |
| 2,420,071 | Fields | May 6, 1947 |
| 2,473,638 | Cumming | June 21, 1949 |
| 2,569,087 | Alexandrescu | Sept. 25, 1951 |
| 2,586,136 | Wyndham | Feb. 19, 1952 |